US006399867B1

United States Patent
Blocki et al.

(10) Patent No.: US 6,399,867 B1
(45) Date of Patent: Jun. 4, 2002

(54) AIR FLOW VISUALIZATION TEACHING APPARATUS

(76) Inventors: Herbert Blocki, 5233 Meadow Ridge, Edina, MN (US) 55435; Martin Blocki, 1835 Wagonwheel, Goshen, IN (US) 46526

( * ) Notice: Subject to any disclaimer, the term of this patent is extended or adjusted under 35 U.S.C. 154(b) by 0 days.

(21) Appl. No.: 09/348,368

(22) Filed: Jul. 7, 1999

(51) Int. Cl.⁷ ................................. G10G 7/02
(52) U.S. Cl. ................. 84/453; 84/410 R; 84/432
(58) Field of Search ............. 84/470 A, 465, 84/473, 474, 453, 330, 331, 332, 434; 482/13; 128/202.22, 205.17

(56) References Cited

U.S. PATENT DOCUMENTS

| | | | | |
|---|---|---|---|---|
| 398,213 A | * | 2/1889 | Hull | 272/99 |
| 4,444,202 A | * | 4/1984 | Rubin et al. | 128/725 |
| 4,770,413 A | * | 9/1988 | Green | 272/99 |
| 4,973,047 A | * | 11/1990 | Norell | 272/99 |
| 5,182,413 A | * | 1/1993 | Epping | 84/277 |
| 5,246,010 A | * | 9/1993 | Gazzara et al. | 128/725 |
| 6,083,141 A | * | 7/2000 | Hougin | 482/13 |

* cited by examiner

Primary Examiner—Robert E. Nappi
Assistant Examiner—Kim Lockett
(74) Attorney, Agent, or Firm—Ryan M. Fountain

(57) ABSTRACT

A second slot is provided in the longitudinally extending shaft of a teaching tool, such as the Pneumo Pro, which is longitudinally spaced apart from the first slot of the tool, for automatically aligning the quadrant, and thereby the propellers, longitudinally and laterally with respect to the first slot during assembly of the apparatus and retaining the propellers in that orientation during usage. The quadrant and support block are formed with flat portions or surfaces which can be received in the second slot to establish a fixed point of longitudinal reference and an intersecting surface to establish a fixed point of lateral or rotational reference with respect to the first slot.

7 Claims, 3 Drawing Sheets

AIR FLOW VISUALIZATION TEACHING APPARATUS

BACKGROUND AND SUMMARY OF THE INVENTION

The present invention relates generally to pedagogical devices for teaching control of air flow from the mouth and, more particularly, to such devices as are used to teach air flow isolation for use in playing the flute and like musical instruments.

The present invention is an improvement upon the flute embouchure/air direction visualization tool invented by Kathrny L. Blocki and Herbert A. Blocki and the subject of a provisional United States patent application filed on or about Nov. 25, 1997. That prior device has been commercially available under the brand name Pneumo Pro. The content of that provisional patent application is specifically incorporated herein by reference as a background to the present invention.

The prior device generally included a longitudinally extending shaft, a quadrant with an aperture therethrough for receiving the shaft, a plurality of posts mounted on the quadrant in parallel to the shaft, and a propeller mounted on each of the posts. The shaft included a slot which simulated a flute embouchure plate and through or over which the student was to blow in practicing. The propellers of each post were positioned in predetermined locations about the slot according to the specific air directions being taught. The student could see the direction and degree of air flow via the rotation of the propellers when the student exhaled air at the slot. A handle was formed by an abutting shaft fixed at one end of the device to facilitate gripping the tool. A support block was provided adjacent the quadrant and through which the shaft was inserted to assist in fixing the quadrant position relative to the shaft.

While the prior device has performed its intended function as a pedagogical tool, significant care and precision could be needed in assembly and alignment of the propellers laterally and longitudinally with respect to the slot. This arose principally because the apertures in the quadrant and support block permitted the shaft to freely rotate and slide longitudinally with respect to those elements during assembly. Further, the abutting shaft could tend to permit rotation of the handle portion with respect to the shaft, thereby reducing stability in use, due to its fixture only along the longitudinal axis of the shaft. Such loss of stability can cause disorientation of the mouth to the slot which disrupts the desired air flow.

Accordingly, it is an object of the present invention to provide an improved apparatus for teaching air flow isolation in breath direction. Other objects include the provision of such an apparatus which:

a. Is less expensive and time consuming to manufacture,
b. Can be readily assembled and accurately aligned by the user,
c. Is more stable in use and less prone to twist, and
d. Reliably establishes alignment of the air flow impingement indicia.

These and other objects of the present invention are obtained by the provision of a second slot in the longitudinally extending shaft of the prior tool, longitudinally spaced apart from the first slot, for automatically aligning the quadrant, and thereby the propellers, longitudinally and laterally with respect to the first slot during assembly of the apparatus and retaining the propellers in that orientation during usage. The first and second slots each include a generally flat bottom face and those faces are generally parallel to each other. The quadrant and support block (if used) are formed with flat portions or surfaces which can be received in the second slot to establish a fixed point of longitudinal reference and an intersecting surface to establish a fixed point of lateral or rotational reference with respect to the first slot. In addition, the handle is formed from a section of intersecting shaft having an aperture therein for receiving the end of the longitudinal shaft. A fastening element locks the two shafts together after insertion by passing through a portion of each of them at the intersection within that aperture.

Other objects, advantages and novel features of the present invention will now be readily apparent to those of ordinary skill in the art from the following drawings and description of preferred embodiments.

DETAILED DESCRIPTION OF PREFERRED EMBODIMENTS

Figure 1:
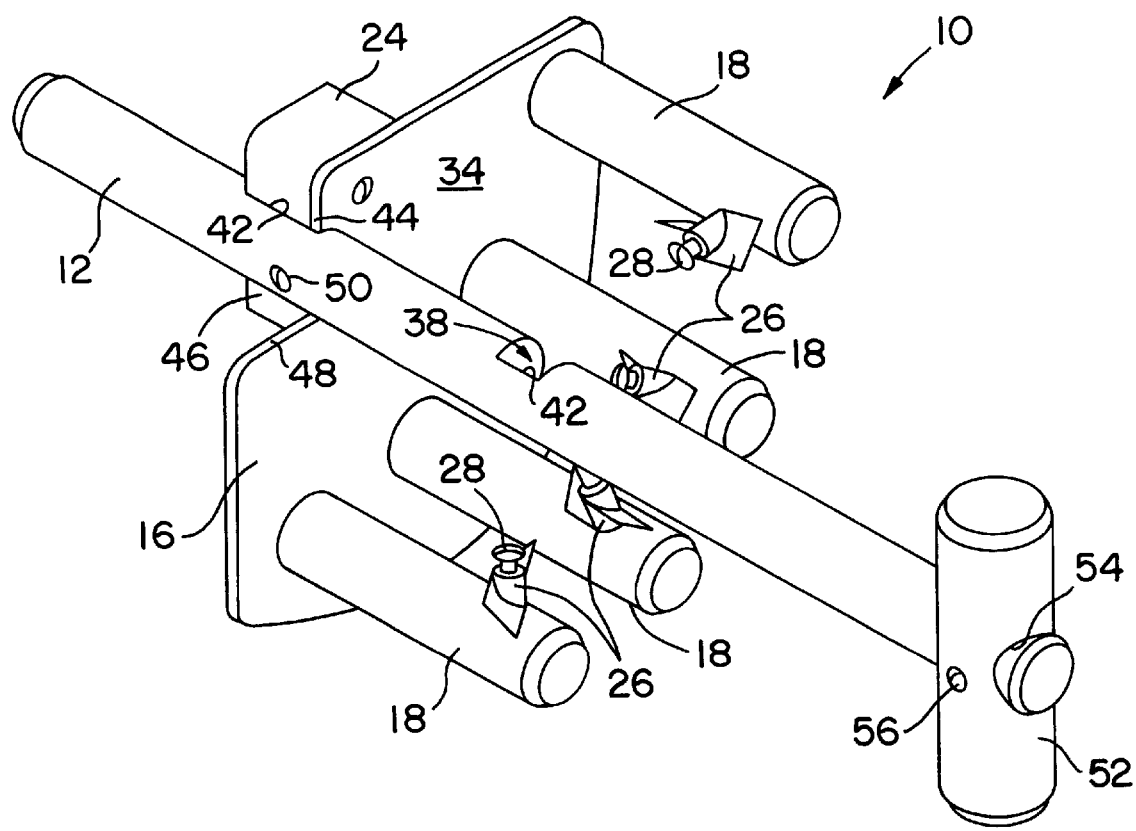
FIG. 1 shows a front, left elevated perspective view of teaching tool incorporating the present invention.
Figure 2:
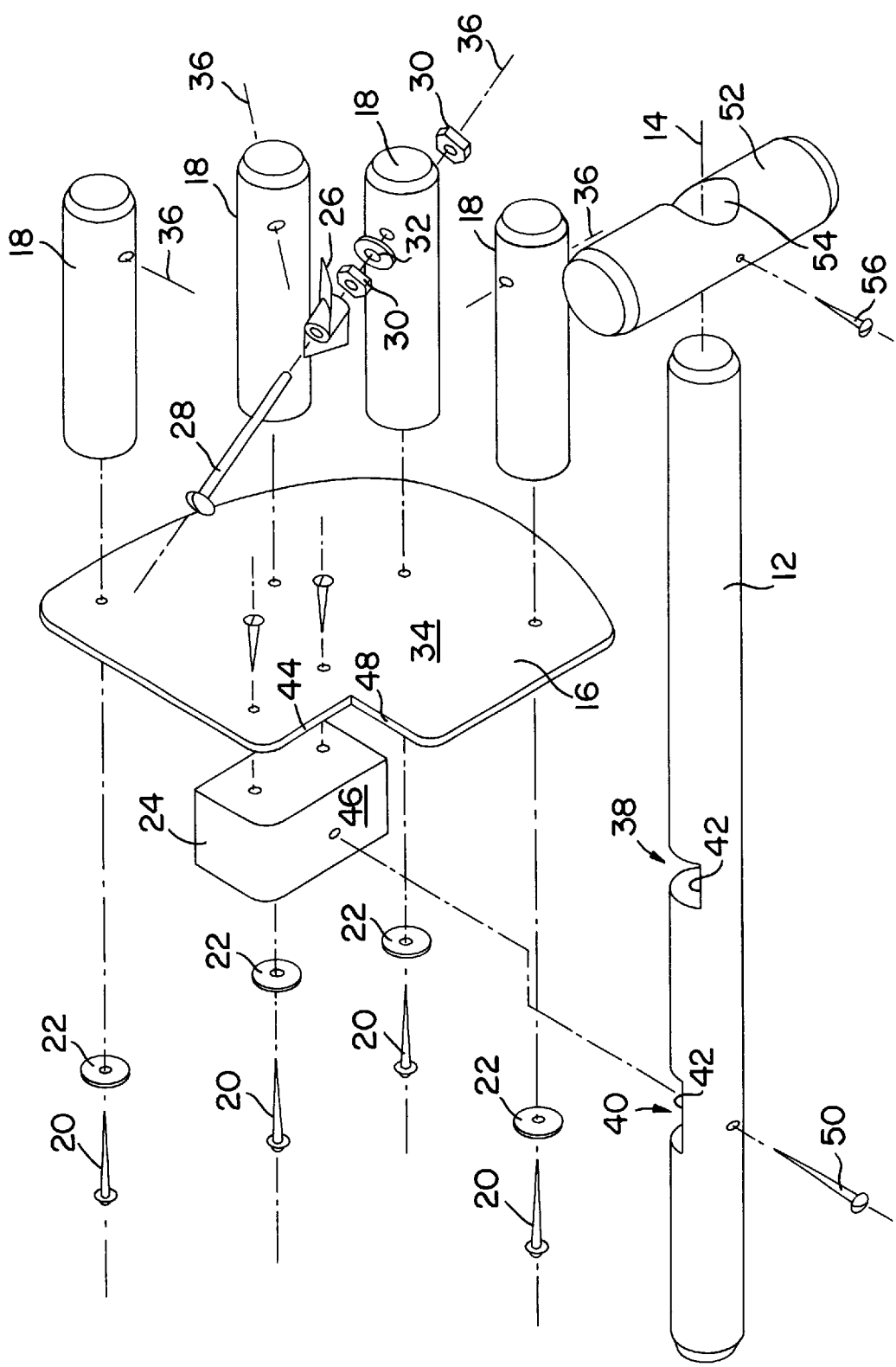
FIG. 2 shows an exploded view of the teaching tool of FIG. 1.
Figure 3:
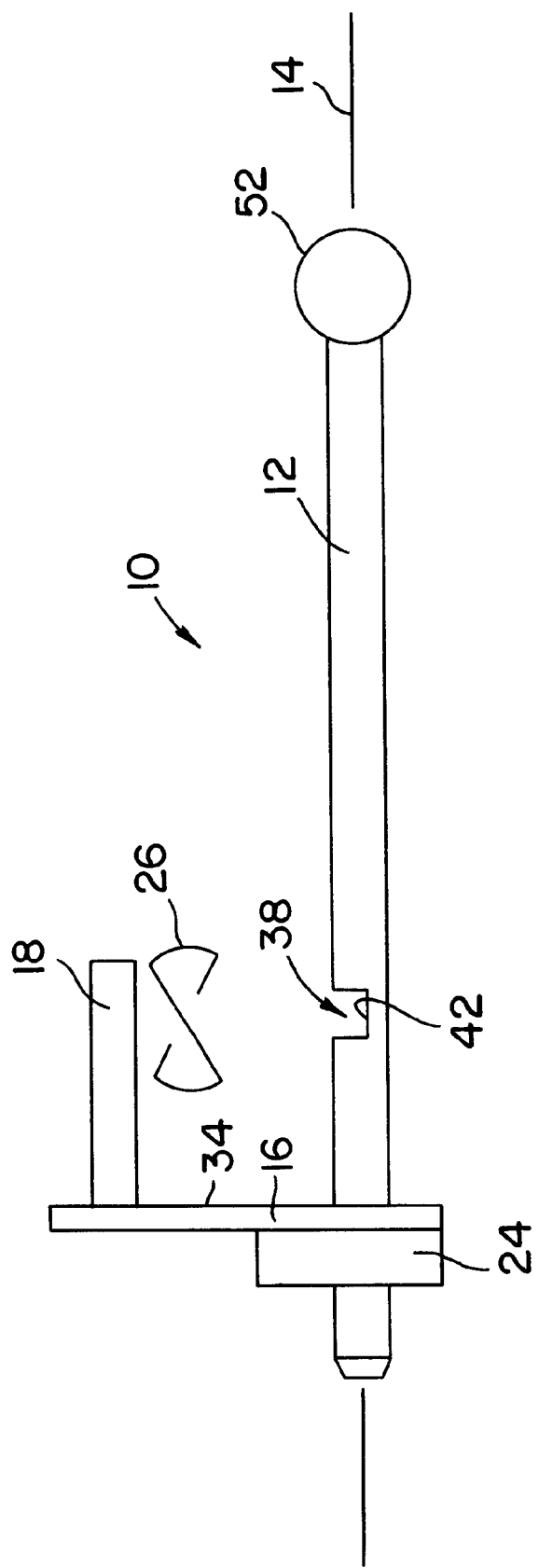
FIG. 3 shows a top view of the teaching tool of FIG. 1.

FIG. 1, which illustrates a preferred embodiment of the present invention, shows a breath directing device or apparatus 10, having a generally cylindrical shaft 12 extending along longitudinal axis 14. Shaft 12 can be formed from wood, plastic or any convenient material. Apparatus 10 also preferably includes a quadrant or platform 16 and a plurality of posts 18 mounted at one end on quadrant 16 via fastener means such as conventional screws 20 and washers 22. Quadrant 16 and posts 18 can also be formed from wood or any convenient material. In order to minimize weight, size and assembly time of apparatus 10, quadrant 16 can be formed to be relatively thin and with a support block 24 employed under a portion of it adjacent shaft 12.

Various means of indicating the impingement and/or the degree of air flow can be mounted on posts 18. Preferably, a freely movable propeller 26 is employed at the free end of each post for this purpose. Propellers 26 can be secured in position to posts 18 by any conventional fastener means, such as bolts 28, nuts 30 and lock washers 32. In especially preferred embodiments, where posts 18 each extend the same distance from forward surface 34 of quadrant 16, propellers 26 are mounted at the same post height and aligned such that their rotational axes 36 intersect. As with the prior teaching tool, adjustment of screws 20 will permit adjustment of the axis of propeller rotation for a given post 18 by rotation of that post about the screw. Once positioned where desired the screw is tightened to restrict movement from that position.

Shaft 12 also includes a first recess or slot 38 and a second recess or slot 40. Preferably, these slots are formed by cutting away or removing a portion of shaft 12 so as to create a generally flat bottom face 42 in each slot. Although slot 38 and 40 need not be of the same width or depth, bottom face 42 of slot 38 is most conveniently formed to be generally parallel to the plane of bottom face 42 of slot 40.

Quadrant 16 and, if used, support block 24 are preferably formed to include flat portions or surfaces 44 and 46, respectively, which can be closely received within slot 40.

Quadrant 16 (or, alternatively, support block 24) is also preferably formed to include intersecting surface 48 which is adjacent to surface 44.

As disposed for assembly, support block 24 is adjacent to quadrant 16 and flat surfaces 44 and 46 are aligned parallel to axis 14. Quadrant 16 and support block 24 are then inserted into slot 40 and fixed thereby with respect to longitudinal movement along shaft 12. Abutment of intersecting surface 48 with a side or peripheral surface of shaft 12 serves to prevent lateral or rotational movement of quadrant 16 with respect to shaft 12 as well. Conventional fasteners, such as screws 50, are provided to secure shaft 12, quadrant 16 and support block 24 fixedly with respect to each other, although it will be understood that in the sequence of assembly, quadrant 16 and support block 24 are preferably so fixed prior to insertion into slot 40. By so fixing and positively locating the quadrant to shaft 12, the location of slot 40 relative to slot 38 along axis 14, the depth of the slots and planar direction of the bottom faces 42 are selectable such that insertion of quadrant 16 into slot 40 will automatically align propellers 26 longitudinally and laterally with the desired air flow paths for the user to visualize as air is blown past, onto or over slot 38.

In the position shown in the Figures, once mounted within slot 40 quadrant 16 extends generally outwardly or orthogonally from shaft 12 and forms a planar surface for receiving posts 18. In preferred embodiments those posts then extend generally parallel to axis 14 from quadrant 16 toward slot 38. Further, where a plurality of posts 18 are employed, the axis of rotation of one propeller of one post is, for example, generally parallel with the plane of the bottom face of slot 38 and other posts 18 are disposed arcuately along surface 34 to a position where the axis of rotation of a propeller of another post is generally orthogonal with the plane of the bottom face 42. The close fit of slot 40 with quadrant 16 and support block 24 serves to retain propellers 26 and slot 38 in the desired orientation even if screws 50 are loosened during usage or maintenance of the apparatus.

A secure handle is also provided for the present invention via an intersecting shaft segment 52 having an aperture 54 therein which is dimensioned to receive an end of shaft 12, preferably that end which is closest to slot 38. In assembly, once shaft 12 is inserted within aperture 54, a conventional fastener, such as screw 56 is provided to pass through shaft segment 52 and into a portion of shaft 12 that is within aperture 54 to fix these elements together. Thus, aperture 54 restricts the handle from lateral or radial movement from axis 14, and screw 56 restricts longitudinal or rotational movement of the handle with respect to axis 14.

Depending upon the specific nature of the materials used, various coatings are recommended for the tool. For example, dipping in canola oil may be used with wood materials Although certain preferred embodiments of the present invention have been described above in detail, that is only by way of illustration and example. Those of ordinary skill in the art will now appreciate that modifications and adaptations of this invention can be made to many environments of use and that the examples given are frames of reference only and not application specific requirements. For example, it will be understood that like apparatus can be employed for use with speech therapy by appropriate repositioning of the propellers. Accordingly, the spirit and scope of the present invention are to be limited only by the terms of the claims below.

What is claimed is:

1. An apparatus for teaching air flow isolation in breath direction, comprising:

a shaft, a quadrant secured to the shaft, at least one post secured to the quadrant, an air flow impingement indicia secured to the post, a first recess in the shaft for establishing a breath initiating location, a second recess in the shaft spaced apart from the first recess for automatically aligning the air flow impingement indicia with the first recess by engagement with the quadrant.

2. The apparatus according to claim 1 wherein a handle is connected to the shaft, the handle having an aperture therein for receiving a portion of the shaft and a means for fixedly securing the handle to the shaft.

3. An apparatus for teaching the control of air flow from the mouth to aid in learning to play a musical instrument, comprising:

a generally cylindrical shaft extending along a longitudinal axis between a first end and a second end, a quadrant fixedly secured to the shaft and extending generally orthogonally therefrom with respect to the longitudinal axis, a plurality of posts secured to the quadrant and extending generally longitudinally parallel with the shaft toward the first end of the shaft, an air flow driven propeller movably secured to each of the posts at predetermined longitudinal positions, a first slot in the shaft for establishing the mouth location, a second slot in the shaft, longitudinally spaced apart from the first slot toward the second end of the shaft, for automatically aligning the quadrant, and thereby the propellers, longitudinally and laterally with respect to the first slot during assembly of the apparatus and retaining the propellers in that orientation during usage.

4. The apparatus according to claim 3 wherein the first and second slots each include a generally flat bottom face and those faces are generally parallel to each other.

5. The apparatus according to claim 4 wherein the posts are rotatably positionable on the quadrant.

6. The apparatus according to claim 5 wherein the plurality of posts are disposed on the quadrant from a position where the axis of rotation of one propeller of one post is generally parallel with the plane of the bottom faces to a position where the axis of rotation of a propeller of another post is generally orthogonal with the plane of the bottom faces.

7. The apparatus according to claim 6 further including a handle member having an aperture therein for receiving the first end of the shaft and a fastening means, penetrating the handle member and the shaft at the location where the shaft is within the aperture, for fixedly securing the handle member with respect to the shaft.

* * * * *